United States Patent Office 3,503,910
Patented Mar. 31, 1970

3,503,910
ELASTOMERIC POLY(EPIHALOHYDRIN) COMPOSITIONS OF IMPROVED PROCESSABILITY
Lyle O. Amberg, Landenberg, Pa., and William D. Willis, Wilmington, Del., assignors to Hercules Incorporated, Wilmington, Del., a corporation of Delaware
No Drawing. Continuation-in-part of application Ser. No. 237,319, Nov. 13, 1962. This application Jan. 5, 1967, Ser. No. 607,405
Int. Cl. C08g *43/02, 51/34, 51/36*
U.S. Cl. 260—18         11 Claims

ABSTRACT OF THE DISCLOSURE

An elastomeric composition of an epihalohydrin polymer containing a small amount of an aliphatic antisticking agent to overcome sticking during compounding. The useful antisticking agents contain at least 6 carbon atoms in their aliphatic chain, have a melting point below 300° F., are substantially nonvolatile at a temperature below 250° F. and are selected from the group consisting of the alkyl primary monoamines; mono- and di-fatty acid esters of poly(hydroxy) alcohols; glyceryl trieleostearate; or a mixture of two or more of these agents.

---

This application is a continuation-in-part of application Ser. No. 237,319 filed Nov. 13, 1962, now abandoned.

This invention relates to poly(epihalohydrin) elastomers of improved processability and, more particularly, to poly(epihalohydrin) elastomers which can be compounded into curable rubbery compositions substantially without sticking to the surfaces of malaxating equipment.

Poly(epihalohydrin) elastomers are comparatively new rubbery polymers which are attractive for the formulation of a wide variety of synthetic rubber goods because they have excellent swelling resistance in solvents and are outstanding in aging resistance, including outdoor exposure, ozone exposure and heat aging in air up to temperatures of at least 250° F. Moreover, synthetic rubbery compositions derived from these polymers also exhibit low heat buildup on flexing, and low flex cut growth, combined with generally good over-all physical properties.

Heretofore, however, poly(epihalohydrin) elastomers have been somewhat handicapped in their utilization in this field of application by an inherent tendency to stick tenaciously to the surfaces of malaxating equipment during the compounding of these elastomers into curable rubbery compositions. In fact, this stickiness is so great that the polymer must be scraped from the mill rolls in small pieces. This is a difficult and time-consuming operation. Attempts to overcome this sticking tendency have not been successful with various materials such as microcrystalline petroleum waxes, petroleum oils, long chain fatty acids, long chain fatty alcohols and long chain fatty acid amides customarily utilized as internal lubricating agents in conventional prior art natural and other synthetic rubber compounding to facilitate smooth extrusion through die openings, to facilitate mold release of the cured rubber goods, to overcome blocking and impart slip to molded, cured rubber goods, and the like.

It is evident, therefore, that the problem of overcoming the inherent tendency for poly(epihalohydrin) elastomers to stick to the surfaces of malaxating equipment during compounding is distinguishable from the prior art problem of overcoming internal intermolecular friction, or from the problem of facilitating release of cured rubber goods from mold surfaces, or from the problem of overcoming blocking of cured rubber goods, or of imparting slip to such goods.

It is the primary object of this invention, therefore, to provide compositions comprising poly(epihalohydrin) elastomers which can be compounded in malaxating equipment substantially without sticking to the surfaces thereof.

It is a further object of this invention to provide an improved process for compounding poly(epihalohydrin) elastomers with various pigments, fillers, extenders, curing agents, etc., in malaxating equipment substantially without sticking to the surfaces thereof.

It is another object of this invention to provide a method for compounding poly(epihalohydrin) elastomers with pigments, fillers, curing agents, and the like, in malaxating equipment, by which the poly(epihalohydrin) elastomers containing compounding ingredients can be easily milled and easily removed from the mill.

Now in accordance with this invention it has been found that the inherent tendency of poly(epihalohydrin) elastomers to stick to the surfaces of malaxating equipment during compounding is substantially overcome by intimately admixing therewith a small amount of an aliphatic compound having at least 6 carbon atoms in the aliphatic chain, a melting point below about 300° F., being substantially nonvolatile at a temperature below about 250° F. and selected from the group consisting of alkyl primary monoamines; mono- and di-saturated and monoethylenically unsaturated fatty acid esters of polyhydroxy alcohols selected from the group consisting of erythritol, pentaerythritol, pentan-pentols and hexan-hexols; glyceryl trieleostearate and mixtures of these in any proportion.

In practicing this invention, the aliphatic compound of this invention, hereinafter designated as "antisticking agent," is intimately admixed with the poly(epihalohydrin) elastomer by working said elastomer with said antisticking agent in malaxating equipment, such as the nip between the rolls of a differential two roll mill, or in a Banbury mixer, or equivalent malaxating equipment, employing customary temperatures and working techniques. Thereafter, pigments, fillers, extenders, curing agents, etc., customarily employed in compounding curable rubbery compositions are readily compounded with the poly(epihalohydrin) elastomer containing the antisticking agent of this invention in malaxating equipment with conventional working techniques and temperatures substantially without sticking of the poly(epihalohydrin) composition to the surfaces of the malaxating equipment. This subsequent compounding may be carried out immediately after incorporating the antisticking agent, or at any convenient time thereafter, as desired. Generally, compounding temperatures up to about 220° F. are suitable for the purposes of this invention.

In a preferred embodiment of the invention the poly (epihalohydrin) elastomer is partially cross-linked prior to incorporating the antisticking agent thereinto. This preliminary partial cross-linking of the elastomer is advantageous because, in combination with the antisticking agent, it makes possible compounding without sticking at higher working temperatures than with antisticking agent alone. It should be noted that partial cross-linking alone is wholly ineffective as a means for overcoming sticking of the elastomer during compounding. The desired degree of preliminary partial cross-linking of the poly (epihalohydrin) elastomer is sufficient to impart an advantageous increase in the internal cohesive strength of the elastomer, but is insufficient to materially alter the process characteristics of the elastomer during subsequent compounding.

This desired degree of preliminary partial cross-linking may be accomplished by intimately admixing a small amount of any curing or cross-linking agent for such halogen-containing polymers such, for example, as a polyamine, or a carbamate salt of a polyamine, with the elastomer at temperatures below curing temperatures, and subsequently partially cross-linking the elastomer containing the small amount of cross-linking agent at customary curing temperatures which are generally between about 240° F. and about 350° F. It will be appreciated, of course, that the amount of cross-linking agent employed to accomplish the desired preliminary partial cross-linking will vary depending on the particular cross-linking agent employed, as well as other factors such as the nature and constitution of the epihalohydrin polymer employed, compounding temperatures, etc. In general, it has been found that an amount of cross-linking agent between about 0.2% and 0.5%, preferably between about 0.3% and about 0.35% by weight, based on poly(epihalohydrin) elastomer weight, is usually sufficient to impart the desired partial cross-linking without materially affecting the processing of the elastomer during subsequent compounding. In any event, it is a simple matter, with the above range of amounts as a guide, to carry out a preliminary partial cross-linking trial run to establish the exact amount of of cross-linking agent to employ.

For example, it is both convenient and practical to work the desired amount of cross-linking agent into the poly(epihalohydrin) elastomer on a differential two-roll mill, or in a Banbury mill, or other equivalent malaxating equipment, at or near room temperature and thereafter heat the rolls, or Banbury mill, or other equivalent malaxating equipment, to about 300–330° F. and work the batch at that temperature for about 5 minutes to accomplish the desired preliminary partial cross-linking. It should be understood, however, that the invention is not limited to the above described means for accomplishing the preliminary partial cross-linking, since all that is necessary is that the elastomer containing the small amount of cross-linking agent be heated to curing temperatures by any suitable means for sufficient time to effect the desired partial cross-linking of the elastomer. For example, the partial cross-linking can be accomplished either batch-wise or continuously as desired, by means of conventional hot air or hot gas ovens or tunnels, by radiant heat sources such as infrared lamps or incandescent heating elements, etc. Thereafter, the antisticking agent of this invention is incorporated into the partially cross-linked elastomer in malaxating equipment at customary malaxating temperatures whereupon the elastomer is then compounded with any desired pigments, extenders, fillers, curing agents, etc., to produce curable rubbery compositions substantially without sticking to the surfaces of the malaxating equipment.

For the preliminary partial cross-linking of the poly (epihalohydrin) elastomer, there may be used any substance or combination of substances known to be a curing or cross-linking agent for such halogen-containing polymers, and a variety of such substances are known for this purpose. For example, it is known that polyamines are effective cross-linking agents for poly(epihalohydrin) polymers. Accordingly, any amine containing two or more amino groups is suitable as the preliminary partial cross-linking agent for the purposes of the invention. The amino groups may be primary, secondary or tertiary amino groups. Exemplary of such polyamines are hydrazine, aliphatic amines such as ethylene diamine, propylene diamine, tetramethylene diamine, hexamethylene diamine, etc., up to alkylene diamines of 20 carbon atoms or more, diethylene triamine, etc., cycloaliphatic amines such as melamine, piperazine, pyrazine (paradiazine), etc., aromatic amines such as p-phenylene diamine, naphthalene diamine, biphenyl diamine, etc., and polymeric amines such as poly(2-methyl-5-vinyl pyridine), etc. Instead of the free amine, a salt of the amine may be used as, for example, the hydrogen halide salts, in which case an alkaline material such as calcium or barium oxide is also added. Internal salts of the amines may also be used as, for example, hexamethylene diamine carbamate, which type of salt decomposes to the free amine at or below the curing temperature.

The poly(epihalohydrin) elastomers of this invention may also be preliminarily partially cross-linked with mixtures of an amine and at least one agent selected from the group consisting of sulfur, dithiocarbamate, thiuram, sulfides and thiazoles, preferably with mixtures of an amine, sulfur and either a dithiocarbamate, a thiuram sulfide or a thiazole. For such mixtures any amine can be used, including primary, secondary and tertiary amines, monoamines and polyamines. Exemplary of amines that can be employed are the rosin amines such as dehydroabietylamine, abietylamine, dihydroabietylamine, tetrahydroabietylamine, and the commercial mixtures of these amines, phenyl-β-naphthylamine, aniline, tributylamine, triethylamine, triethanolamine, poly(2-methyl-5-vinyl-pyridine), piperidine, piperazine, collidine, lutidine, ethylene diamine, hexamethylene diamine, p-phenylene diamne, o-hydroxybenzyl-N,N-dimethylamine, dicyclohexylamine, dicyclohexylethylamine, etc. Salts of these amines, as for example, the hydrogen halide salts may be used, in which case an alkaline material such as calcium or barium oxide must also be added. Internal salts of the amines, such as hexamethylene diamine carbamate may also be used.

Any dithiocarbamate, i.e., a metal, ammonia, or amine salt of dithiocarbamic acid and its alkyl or cycloalkyl substituted deratives can be used in combination with an amine, or in combination with an amine, and sulfur to effect the desired preliminary partial cross-linking of the poly(epihalohydrin) elastomer. Exemplary of the dithiocarbamates that can be used are zinc dimethyldithiocarbamate, tellurium diethyldithiocarbamate, piperidinium pentamethylene dithiocarbamate, etc.

Any alkyl thiuram sulfide, i.e., any compound having the general formula:

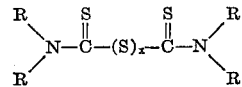

in which $x$ is an integer not less than 1 and R is hydrogen or alkyl, preferably methyl or ethyl, with at least one R on each nitrogen being alkyl, can be used in combination with an amine, or with an amine and sulfur to effect the preliminary partial cross-linking of the poly(epihalohydrin) elastomer. Exemplary of the thiuram sulfides that can be used are symmetrical dimethylthiuram disulfide, tetramethyl thiuram monosulfide, tetramethyl thiuram disulfide, tetramethyl thiuram tetrasulfide, tetraethyl thiuram monosulfide, tetraethyl thiuram disulfide, etc.

Any thiazole, but preferably a benzothiazole, i.e., a compound having the general formula:

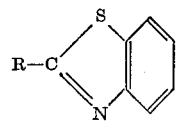

in which R is hydrogen, alkyl alkyl mercaptan, —SH, or

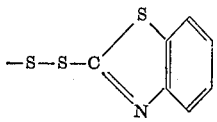

can be used in combination with an amine, or with an amine and sulfur to effect preliminary partial cross-linking of the poly(epihalohydrin) elastomer. Exemplary of the thiazoles that can be so used are benzothiazole, 2-mercaptobenzothiazole, 2-methyl mercaptobenzothiazole, 2-2-ethyl benzothiazole, 2-benzothiazyl disulfide, etc.

The proportions of the ingredients in the above mixtures may be varied within the following ranges: amine, from about 2 to about 10 parts; sulfur, from about 1 to about 5 parts; sulfur compound, from about 0.5 to about 5 parts.

It is also known that poly(epihalohydrin) polymers can be cured or cross-linked with mixtures of at least one metal compound selected from the group consisting of salts of aromatic carboxylic acids, salts of aliphatic carboxylic acids, salts of carbonic acid, salts of phosphorous acid, salts of silicic acid, and oxides of the metals of Groups II–A, II–B and IV–A of the Periodic Table of Elements (Lange's Handbook of Chemistry, 8, pages 56–57, 1952), with at least one heterocyclic compound selected from the group consisting of 2-mercaptoimidazolines and 2-mercaptopyrimidines. Accordingly, such mixtures also can be employed to effect the preliminary partial cross-linking of the poly(epihalohydrin) elastomers for the purposes of this invention.

Suitable metal compounds for use in admixture with 2-mercaptoimidazolines or 2-mercaptopyrimidines for effecting preliminary partial cross-linking of the poly(epihalohydrin) elastomers include, by way of example, stannous oxide, stannic oxide, lead monoxide, red lead oxide, germanium mono-oxide, calcium oxide, zinc oxide, magnesium oxide, zinc carbonate, lead carbonate, dibasic lead carbonate, calcium carbonate, mercuric carbonate, beryllium carbonate, lead orthosilicate, barium silicate, cadmium silicate, magnesium silicate, dibasic lead phthalate, magnesium benzoate, calcium benzoate, zinc salicylate, strontium salicylate, lead oleate, dibasic lead stearate, dibasic lead phosphite, magnesium phosphite, etc.

Any 2-mercaptoimidazoline, i.e., any compound having the general formula:

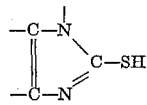

can be used in combination with one or more of the above-defined metal compounds to effect preliminary partial cross-linking of the poly(epihalohydrin) elastomers. Exemplary of the 2-mercaptoimidazolines that can be used are 2-mercaptoimidazoline, 4-methyl-2-mercaptoimidazoline, 5-ethyl-4-butyl-2-mercaptoimidazoline, etc.

Any 2-mercaptopyrimidine, i.e., any compound having the general formula:

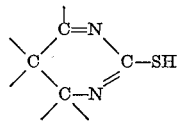

can be used in combination with one or more of the above-defined metal compounds to effect preliminary partial cross-linking of the poly(epihalohydrin) elastomers. Exemplary of the 2-mercaptopyrimidines that can be used are 2-mercaptopyrimidine, 4,6-dimethyl-2-mercaptopyrimidine, 5-butyl-2-mercaptopyrimidine, 4-ethyl-5-propyl-2-mercaptopyrimidine, etc.

The ratio of metal compound to heterocyclic compound in the above mixtures may vary from about 100:1 to about 2:1.

The elastomers of this invention include any high molecular weight polymer of an epihalohydrin having an inherent tendency to stick to the surfaces of malaxating equipment during compounding of the elastomer into curable rubbery compositions. Such elastomeric polymers can be homopolymers prepared by polymerizing any monomeric epihalohydrin, e.g., epifluorohydrin, epichlorohydrin, epibromohydrin, or epiiodohydrin. They can also be copolymers in which the repeating units are derived from mixtures in any proportion of two or more molecular species of monomeric epihalohydrins, such for example, as mixtures of epichlorohydrin and epibromohydrin, or mixtures of epifluorohydrin, epibromohydrin, and epiiodohydrin. They also include copolymers of epihalohydrins with one or more other epoxides in which a major amount of the repeating units, e.g., at least about 50% by weight, are derived from epihalohydrins. The elastomeric polymer may be essentially wholly amorphous or it may be a mixture of amorphous and crystalline polymers. Generally, the amorphous polymers provide the most rubbery vulcanizates. However, excellent rubbers are obtained by vulcanizing mixtures of amorphous and crystalline polymers. In this case, the amount of the crystalline polymer is generally less than about 25% to 30% by weight of the mixture.

The epihalohydrin elastomeric polymers of this invention are essentially linear polyethers in which polymerization, at least in major part, has taken place through the epoxide linkage so that the polymer contains halomethyl groups attached to the main polymer chain. The homopolymers are believed to have the following general formula:

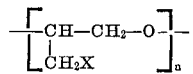

in which X is halogen and $n$ is a numeral designating the number of repeating units in the polymer. In the same way, when an epihalohydrin is copolymerized with one or more other epoxides (including other epihalohydrins), polymerization takes place through the epoxide linkage even though other polymerizable groups may be present. Typical of other epoxides that can be copolymerized with epihalohydrins to produce the elastomeric polymers of this invention include, by way of example, the alkylene oxides such as ethylene oxide, propylene oxide, butene-1 oxide, cis and trans butene-2 oxides, hexene-1 oxide, hexene-2 oxide, dodecene-1 oxide, isobutylene epoxide, and the like; cycloaliphatic epoxides such as cyclohexene oxides, vinyl cyclohexene oxides (both mono- and dioxides), α-pinene epoxide, dipentene epoxide, and the like; epoxy ethers such as ethyl glycidyl ether, isopropyl glycidyl ether, tert-butyl glycidyl ether, phenyl glycidyl ether, chlorophenyl glycidyl ether, 2-chloroethyl glycidyl ether, ethylphenyl glycidyl ether, vinyl glycidyl ether, allyl glycidyl ether, methallyl glycidyl ether, vinylcyclohexyl glycidyl ether, o-allylphenyl glycidyl ether, p-vinylbenzyl glycidyl ether, and the like; ethylenically unsaturated glycidyl esters such as glycidyl crotonate, glycidyl oleate, glycidyl methacrylate, and the like; and other epoxides are, for example, styrene oxide, α-methylstyrene oxide, butadiene monoxide, butadiene dioxide, epoxy stearates, 3,4-epoxy-1-pentene, 3,4-epoxy-1-vinylcyclohexene, divinylbenzene monoxide, and the like.

The epihalohydrin elastomeric polymers of this invention are characterized by having a weight average molecular weight of at least bout 40,000 and preferably at least about 100,000. Molecular weights of this order usually correspond to reduced specific viscosity, $\eta_{sp.}/c$, of at least about 0.2 and preferably at least about 0.5. Reduced specific viscosities are generally determined on solutions of the polymers at 0.1% concentration in α-chloronaphthalene at 100° C., although polymers high in epifluorohydrin content are preferably determined on solutions thereof at 0.1% concentration in cyclohexanone at 50° C.

In the expression $\eta_{sp.}/c$ for defining reduced specific viscosity, the symbol $\eta_{sp.}$ stands for specific viscosity and the symbol C stands for concentration of the polymer in the solution thereof in solvent expressed as grams per 100 ml. of solution. Specific viscosity, $\eta_{sp.}$, is obtained by dividing the difference between the viscosity of the polymer solution and the viscosity of the solvent used therein by the viscosity of the solvent.

These epihalohydrin elastomeric polymers can be prepared by contacting an epihalohydrin monomer, a mixture of epihalohydrin monomers, or a mixture of one or more epihalohydrin monomers and one or more other epoxide monomers with a catalyst formed by reacting an organoaluminum compound with from about 0.1 mole to about 1.5 moles of water per mole of organoaluminum compound. They may also be prepared by contacting a monomeric epihalohydrin, a mixture of monomeric epihalohydrins, or a mixture of one or more monomeric epihalohydrins and one or more other monomeric epoxides with a catalyst formed by reacting an organoalumium compound with from about 0.01 mole to about 2 moles of a chelating agent such as acetylacetone, benzoylacetone, acetoacetic acid, ethyl glycolate, oxalic acid, glyoxal monoxime, etc., and with from about 0.1 mole to about 1.5 moles of water per mole of organoaluminum compound. Exemplary of organoaluminum compounds that can be so reacted with chelating agent and/or with water and used as the catalyst are triethylaluminum, triisobutylaluminum, diethylaluminum hydride, etc. The amount of such catalyst will generally be in the range from about 0.2 to about 10 mole percent based on the weight of monomers being polymerized, preferably from about 1 to about 5 mole percent.

The polymerization reaction is generally carried out in the presence of an inert, liquid, organic diluent, but can be carried out in an essential bulk polymerization process. Suitable diluents that can be used for the polymerization are the ethers, hydrocarbons, halogenated hydrocarbons, and mixtures of such diluents. The temperatures of the polymerization process can be varied over a wide range, generally from about −80° C. to about 250° C., and while atmospheric pressure is usually used the pressure can be varied from subatmospheric up to several atmospheres.

As pointed out hereinabove, the antisticking agents of this invention are aliphatic compounds having at least 6 carbon atoms in the aliphatic chain, a melting point below about 300° F., being substantially nonvolatile at a temperature below about 250° F. and selected from the group consisting of alkyl primary monoamines; mono- and di-saturated and monoethylenically unsaturated fatty acid esters of polyhydroxy alcohols selected from the group consisting of erythritol, pentaerythritol, pentanpentols, and hexan-hexols; glyceryl trieleostearate; and mixtures of any of these in any proportion. The amount of antisticking agent employed is in the range from about 0.5% to about 10% by weight, based on the weight of poly(epihalohydrin) elastomer, preferably between about 1% and about 5% by weight, and sufficient to impart antisticking properties to the poly(epihalohydrin) elastomer during compounding thereof.

Any alkyl primary monoamine having at least 6 carbon atoms in the alkyl group, a melting point below about 300° F. and being substantially nonvolatile at a temperature below about 250°F. is effective as the antisticking agent in accordance with this invention. Typical alkyl primary monoamines include by way of example, dodecyl amine, tridecyl amine, tetradecyl amine, hexadecyl amine, octadecyl amine, docosyl amine, tetracosyl amine, octacosyl amine, triacontyl amine, hexatriacontyl amine, tetratriacontyl amine, hexatetracontyl amine, octylamine, heptylamine, hexylamine and the like.

Any mono- or di-saturated or monoethylenically unsaturated fatty acid ester of any poly(hydroxy) alcohol selected from the group consisting of erythritol, pentaerythritol, pentan-pentols, and hexan-hexols having a melting point below about 300° F. and being substantially nonvolatile at a temperature below about 250° F. is effective as an antisticking agent in accordance with this invention. The saturated or monoethylenically unsaturated carboxylate radicals of these esters can be derived from any of the saturated or monoethylenically unsaturated fatty acids which have at least 6 carbon atoms in the alkyl chain. Suitable acids of this type are heptoic acid, caprylic acid, nonylic acid, capric acid, dodecanoic acid, tridecanoic acid, tetradecanoic acid, pentadecanoic acid, hexadecanoic acid, heptadecanoic acid, octadeanoic acid, nonadecanoic acid, eicosanoic acid, docosanoic acid, tricosanoic acid, tetracosanoic acid, triacontanoic acid, tetratriacontanoic acid, hexatetracontanoic acid, dodecenoic acids, tridecenoic acids, pentadecenoic aids, hexadecenoic acids, octadecenoic acids, eicosenoic acids, docosenoic acids, triacontenoic acids, and the like. With respect to the poly(hydroxy) alcohol radicals of these esters, these alcohol radicals may be derived from any of the pentan-pentols, or hexan-hexols, in addition to erythritol and pentaerythritol, the pentan-pentols including adonitol, d-arabitol, 1-arabitol, and xylitol, and the hexan-hexols including d-mannitol, d-sorbitol, d-iditol, and dulcitol. Some typical poly(hydroxy) alcohol esters suitable as antisticking agents in accordance with this invention include by way of example erythritol monocaprate, erythritol monocaprylate, erythritol monolaurate, erythritol dilaurate, pentaerythritol monomyristate, pentaerythritol dimyristate, d-arabitol monooleate, d-arabitol dioleate, d-sorbitol monostearate, d-sorbitol distearate, d-mannitol monomyristoleate, and the like.

Glyceryl trieleostearate is the principal constituent of China wood oil, or tung oil, and is also the major constituent of bagilumbang nut oil and essang nut oil. It appears to be unique among the glyceride esters of long chain aliphatic acids in being the only glyceride ester suitable as an antisticking agent for the purposes of this invention. Its suitability appears to be related to the high thermal reactivity of its conjugated system of three double bonds.

This invention contemplates compounding poly(epihalohydrin) elastomers with any of the numerous host of conventional pigments, fillers, extenders, plasticizers, etc. commonly employed in compounding natural and synthetic rubbery polymers for end use applications in any desired combination of such modifying adjuvants, and in any desired proportion thereof, to prepare curable rubbery compositions for any desired purpose. A wide variety of suitable curing agents for poly(epihalohydrin) elastomers have been described hereinbefore.

The general nature of the invention having been set forth, the following examples illustrate some specific embodiments of the invention. It is to be understood, however, that the invention is in no way limited to the examples, since this invention may be carried out by the use of various modifications and changes within the scope of the invention as herein set forth and described. All parts in the following examples are by weight, unless otherwise specified.

EXAMPLE 1

Part A.—One hundred (100) parts of homopoly(epichlorohydrin) elastomer having a reduced specified viscosity of 1.6 as measured on a 0.1% by weight solution of the elastomer in α-chloronaphthalene at 100° C. was placed at about 150° F. on a differential two-roll mill having a roll speed ratio of 18 to 24, and was milled at the above temperature. Sticking of the elastomer to the mill surfaces was pronounced. However, even though the elastomer was sticking to the rolls, the following materials in the amounts indicated were milled into the elastomer on the two-roll mill at the above temperature:

Compounding ingredients: Parts by weight
- Fast extrusion furnace carbon black _____ 50
- Red lead _____ 5
- Polymerized trimethyl dihydroquinoline _____ 1
- 2-mercaptoimidazoline _____ 1.5

The above compounding oingredients did not diminish the tendency of the poly(epichlorohydrin) composition to stick to the rolls during compounding, even when the temperature of the mill was progressively reduced to essentially room temperature.

Part B.—One hundred (100) parts of homopoly(epichlorohydrin) elastomer having a reduced specific viscosity of 1.6 as measured on a 0.1% by weight solution of the elastomer in α-chloronaphthalene at 100° C. was placed at about 150° F. on a differential two-roll mill having a roll speed ratio of 18 to 24, and 2 parts of stearylamine were intimately admixed with the elastomer by working on the mill at the above temperature. There was substantially no sticking of the poly(epichlorohydrin) elastomer containing the stearylamine to the roll surfaces, and the compounding ingredients set forth in Part A, in the amounts shown, were easily milled into the elastomer containing the stearyl amine with substantially no stick- of the composition during the compounding at about 150° F. The mill temperature was then progressively raised to above 180° F. with substantially no sticking of the compounded poly(epichlorohydrin) composition to the roll surfaces. Slight sticking was observed at about 190° F.

Part C.—One hundred (100) parts of the same homopoly(epichlorohydrin) elastomer employed in Parts A and B were placed at room temperature on the same differential two-roll mill employed in Parts A and B, and 0.3 part of hexamethylenediamine was intimately admixed with the elastomer on the mill at room temperature. The poly(epichlorohydrin) elastomer containing the hexamethylenediamine was then removed from the rolls which were then heated to 300° F., whereupon the poly(epichlorohydrin) elastomer containing the hexamethylenediamine was again placed on the rolls and worked for 5 minutes at 300° F. to partially cross-link the poly(epichlorohydrin). Sticking to the roll surfaces was pronounced during this preliminary partial cross-linking of the elastomer. The temperature of the rolls was then reduced to about 150° F. and 2 parts of stearyl amine were intimately admixed with the partially cross-linked poly(epichlorohydrin) elastomer on the two-roll mill at this temperature. Incorporation of the stearyl amine substantially overcame all tendency for the partially cross-linked elastomer to stick to the rolls, and the compounding ingredients set forth in Part A, in the amounts shown, were easily milled into the partially cross-linked poly(epichlorohydrin) containing stearyl amine with substantially no sticking of the composition during the compounding at 150° F. The mill temperature was then progressively raised to above 200° F. with substantially no sticking of the compounded partially cross-linked poly(epichlorohydrin) composition to the roll surfaces.

Part D.—The procedure described in Part C was duplicated, except that 0.3 part of hexamethylenediamine carbamate was employed for preliminary partially crosslinking of the poly(epichlorohydrin) in place of 0.3 part of hexamethylenediamine employed in Part C. Substantially the same results were obtained as described in Part C. More specifically, the poly(epichlorohydrin) elastomer stuck to the rolls during the preliminary partial cross-linking at 300° F. However, incorporation of the stearyl amine to the partially cross linked elastomer at about 150° F. substantially overcame sticking to the rolls during compounding at 150° C., and there was substantially no sticking of the compound partially cross-linked poly(epichlorohydrin) composition to the roll surfaces when the roll temperatures were progressively raised to above 210° F.

EXAMPLE 2

A series of homopoly(epichlorohydrin) elastomeric compositions was prepared duplicating the procedure of Part D of Example 1 for each member of the series except that a different material was evaluated in each member of the series as an antisticking agent in place of the stearyl amine employed in Part D of Example 1. Observations were made for each material tested with respect to its ability to overcome sticking of the poly(epichlorohydrin) elastomeric composition during compounding at 150° F. and at higher temperatures. Table 1 following lists each of the materials tested as antisticking agents, together with observations made with respect to its suitability as an antisticking agent.

TABLE 1

| Material evaluated as antisticking agent | Observations on suitability as antisticking agent |
| --- | --- |
| (1) Primary amine derived from tallow fatty acids | No sticking at any temperatures up to at least 200° F. +. |
| (2) Primary amine derived from tall oil fatty acids | No sticking at any etmprature up to at least 170° F. |
| (3) Polyalkanol polyamine | Pronounced sticking at all compounding temperatures. |
| (4) Triethanolamine | Do. |
| (5) Stearyl amide | Do. |
| (6) Stearonitrile | Do. |
| (7) Chlorinated paraffin wax containign about 70% by weight of chlorine | Do. |
| (8) Stearyl alcohol | Do. |
| (9) Stearic acid | Do. |
| (10) Polymerized ethylene oxide having molecular weight of about 1,000 | Do. |
| (11) Sorbitol monostearate | No sticking at any temperature up to at least 200° F. +. |
| (12) Hydrogenated vegetable oil with added emulsifier | Pronounced sticking at all compounding temperatures. |
| (13) Corn oil | Do. |
| (14) Safflower oil | Do. |
| (15) China wood oil | No sticking at any temperature up to at least 190° F. |
| (16) Carnauba wax | Pronounced sticking at all compounding temperatures. |
| (17) Trinonylated phenyl phosphite | Do. |
| (18) Microcrystalline paraffin wax | Do. |

EXAMPLE 3

A series of three homopoly(epichlorohydrin) compositions were prepared by the procedure described in Part C of Example 1, except that a different antisticking agent was employed in each of the three members of the series, and the preliminary partial crosslinking was carried out for 5 minutes at 330° F. instead of at 300° F. as set forth in Part C of Example 1. Observations relative to freedom from sticking during compounding were made. After compounding, separate portions of each composition were press cured into test specimens at 310° F. for 30 minutes, for 45 minutes and for 60 minutes, respectively, and each cured test specimen was evaluated at room temperture for modulus at 100% elongation, tensile strength, elongation at break and Shore A2 hardness, both initially after molding and after aging for three days in a circulating air oven at 300° F. Table 2 following gives the composition of each test formula after compounding, together with pertinent data relative to freedom from sticking during compounding, and modulus at 100% elongation, tensile strength, elongation at break, and Shore A2 hardness of the cured molded specimens.

TABLE 2

| Ingredients | Formulation, Parts by Weight | | |
|---|---|---|---|
| | Formula 1 | Formula 2 | Formula 3 |
| Homopoly(epichlorohydrin)-reduced specific viscosity of 1.6 | 100 | 100 | 100 |
| Hexamethylenediamine (employed for prepartial cross-linking of poly(epichlorohydrin)) | 0.3 | 0.3 | 0.3 |
| Antisticking Agent: | | | |
| Stearyl amine | 2 | | |
| Sorbitol monostearate | | 2 | |
| China wood oil | | | 2 |
| Fast extrusion furnace carbon black | 50 | 50 | 50 |
| Red lead | 5 | 5 | 5 |
| Polymerized trimethyl dihydroquinoline | 1 | 1 | 1 |
| 2-mercaptoimidazoline (employed in combination with red lead for final cure of composition) | 1.5 | 1.5 | 1.5 |

| | Processing Observations Relative to Freedom from Sticking | | |
|---|---|---|---|
| | Substantially no sticking at any temperature up to at least 200° F.+ | Substantially no sticking at any temperature up to at least 200° F.+ | Substantially no sticking at any temperature up to at least 190° F. |

| | Press cure at 310° F. (minutes) | Test Data on Cured Specimens | | | | | |
|---|---|---|---|---|---|---|---|
| | | Initial | Aged | Initial | Aged | Initial | Aged |
| Modulus at 100% elongation pounds per square inch | 30 | 1,005 | 790 | 1,230 | 1,210 | 1,095 | 990 |
| | 45 | 1,100 | 890 | 1,370 | 1,410 | 1,185 | 1,100 |
| | 60 | 1,320 | 835 | 1,460 | 1,165 | 1,325 | 960 |
| Tensile strength, pounds per square inch | 30 | 2,090 | 790 | 2,360 | 1,375 | 2,380 | 970 |
| | 45 | 2,130 | 890 | 2,350 | 1,480 | 2,350 | 1,100 |
| | 60 | 2,290 | 835 | 2,395 | 1,370 | 2,410 | 960 |
| Elongation at break, percent | 30 | 265 | 100 | 275 | 120 | 285 | 100 |
| | 45 | 235 | 100 | 230 | 105 | 235 | 100 |
| | 60 | 215 | 100 | 215 | 115 | 215 | 100 |
| Shore A2 Hardness | 30 | 72 | 78 | 74 | 81 | 71 | 80 |
| | 45 | 74 | 78 | 76 | 83 | 72 | 80 |
| | 60 | 75 | 78 | 78 | 81 | 75 | 80 |

EXAMPLE 4

One hundred (100) parts of an elastomeric copolymer of epichlorohydrin and propylene oxide, containing 83% by weight of epichlorohydrin and 17% of propylene oxide, and having a reduced specific viscosity of 12.9 as measured on a 0.1% by weight solution of the copolymer in α-chloronaphthalene at 100° C., was placed on a differential two-roll mill having a roll speed ratio of 18 to 24 and roll temperatures between 110° F. and 120° F., and was worked on the rolls. Sticking of the copolymer to both rolls was pronounced.

Two (2) parts of stearylamine were then intimately admixed with the copolymer by working on the mill at the above temperatures, whereupon the copolymer then worked easily on the rolls with no sticking to the rolls or batch splitting. The following compounding ingredients were then easily milled into the copolymer containing the stearylamine with no sticking of the composition to the rolls during the compounding.

Compounding ingredients: Parts by weight
- Polymerized trimethyl dihydroquinoline _____ 1
- White lead (paint grade) _____ 5
- Fast extrusion furnace carbon black _____ 50
- Hexamethylenediamine carbamate _____ 2

Vulcanized sheets were obtained with this compound by curing at 310° F. for 45 minutes.

EXAMPLE 5

A series of amines and esters were tested as antisticking agents as follows:

A differential two-roll mill having a roll speed ratio of 18 to 24 was preheated to 140° F. and then the polymer was added and allowed to make several revolutions. At this time the antisticking agent was added in an amount of 1 part per hundred. The rolls were then heated to a temperature of 300° F. and held at that temperature for 5 minutes while the polymer was being milled. The polymer was then removed while the rolls were at 300° F. and the antisticking properties of the agent assessed at that temperature. The rolls were cooled to 90° F. for the front roll and 110° F. for the back roll. The polymer was put back on the rolls and the antisticking properties of the agent assessed at that temperature. The same homopoly(epichlorohydrin) elastomer having a reduced specific viscosity of 1.8 as measured on a 0.1% by weight solution of the elastomer in 2-chloronaphthalene at 100° C. was used in each case. The specific antisticking agents tested, together with observations made with respect to its properties, are listed in Table 3.

TABLE 3

| Material evaluated as antisticking agent | Observations | |
|---|---|---|
| | Removed from rolls at 300° F. | Removed from rolls at 90° F., (front), at 110° F. (back) |
| (1) Primary amine derived from tallow fatty acids | No sticking | No sticking. |
| (2) Dodecyl amine | do | Do. |
| (3) Octylamine | do | Do. |
| (4) Heptylamine | do | Slight sticking. |
| (5) Hexylamine | do | Do. |
| (6) Amylamine | Slight sticking | Pronounced sticking. |
| (7) Sorbitol monocaprylate | No sticking | No sticking. |
| (8) Pentaerythritol monolaurate | do | Do. |
| (9) Pentaerythritol tetralaurate | Pronounced sticking | Pronounced sticking. |

It will be apparent from the foregoing description that this invention accomplishes the objectives set forth and represents an important advance and contribution to the art of compounding poly(epihalohydrin) elastomers into curable rubbery compositions in commercial malaxating equipment.

What we claim and desire to protect by Letters Patent is:

1. An elastomeric composition comprising an epihalohydrin polymer having a weight average molecular weight of at least 40,000 and between about 0.5% and about 10% by weight of said epihalohydrin polymer of an aliphatic compound having at least 6 carbon atoms in the aliphatic chain, a melting point below about 300° F., being substantially nonvolatile at a temperature below about 250° F. and selected from the group consisting of alkyl primary monoamines, mono- and di-saturated and monoethylenically unsaturated fatty acid esters of poly-(hydroxy) alcohols selected from the group consisting of arythritol, pentaerythritol, pentan-pentols, and hexan-hexols; glyceryl trieleostearate; and mixtures thereof intimately admixed with said epihalohydrin polymer, said epihalohydrin polymer being a homopolymer of an epihalohydrin.

2. An elastomeric composition in accordance with claim 1 in which said aliphatic compound is an alkyl primary monoamine.

3. An elastomeric composition in accordance with claim 2 in which said amine is stearyl amine.

4. An elastomeric composition in accordance with claim 2 in which said amine is a primary amine of tallow fatty acids.

5. An elastomeric composition in accordance with claim 2 in which said amine is a primary amine of tall oil fatty acids.

6. An elastomeric composition in accordance with claim 1 in which said aliphatic compound is a monosaturated fatty acid ester of a hexan-hexol.

7. An elastomeric composition in accordance with claim 6 in which said fatty acid ester is sorbitol monostearate.

8. An elastomeric composition in accordance with claim 1 in which said aliphatic compound is glyceryl trieleostearate.

9. An elastomeric composition in accordance with claim 1 in which said epihalohydrin polymer is a homopolymer of epichlorohydrin.

10. In the process of compounding an elastomeric epihalohydrin homopolymer into a curable rubbery composition in malaxating equipment, the improvement to overcome sticking of said elastomer to the surfaces of said malaxating equipment during said compounding which comprises intimately admixing said elastomer with between about 0.5% and about 10% by weight of said elastomer of an aliphatic compound having at least 6 carbon atoms in the aliphatic chain, a melting point below about 300° F., being substantially nonvolatile at a temperature below about 250° F., and selected from the group consisting of alkyl primary monoamines, mono- and di-saturated and monoethylenically unsaturated fatty acid esters of poly(hydroxy) alcohols selected from the group consisting of erythritol, pentaerythritol, pentan-pentols, and hexan-hexols, glyceryl trieleostearate, and mixtures thereof in any proportion sufficient to overcome said sticking during compounding.

11. In the process of compounding an elastomeric epihalohydrin homopolymer into a curable rubbery composition in malaxating equipment, the improvement to overcome sticking of said elastomer to the surfaces of said malaxating equipment during said compounding which comprises initially partially cross-linking said elastomer with a small amount of a cross-linking agent for said elastomer, sufficient to impart an increase in the internal cohesive strength of said elastomer without altering the processing characteristics thereof during compounding, and thereafter intimately admixing the partially cross-linked elastomer with between about 0.5% and about 10% by weight of said elastomer of an aliphatic compound having at least 6 carbon atoms in the aliphatic chain, a melting point below about 300° F., being substantially nonvolatile at a temperature below about 250° F., and selected from the group consisting of alkyl primary monoamines, mono- and di-saturated and monoethylenically unsaturated fatty acid esters of poly(hydroxy) alcohols selected from the group consisting of erythritol, pentaerythritol, pentan-pentols, and hexan-hexols; glyceryl trieleostearate; and mixtures thereof in any proportion, sufficient to overcome said sticking during compounding.

References Cited

UNITED STATES PATENTS

| | | | |
|---|---|---|---|
| 3,026,305 | 3/1962 | Robinson | 260—79.5 |
| 3,158,580 | 11/1964 | Vandenberg | 260—2 |
| 3,158,581 | 11/1964 | Vandenberg | 260—2 |
| 3,305,501 | 2/1967 | Spalding | 260—18 |

OTHER REFERENCES

Morton: Introduction to Rubber Technology, Reinhold Pub. Corp., New York, N.Y., 1959, 539 pages (pp. 115–164 relied upon).

HOSEA E. TAYLOR, Jr., Primary Examiner

R. W. GRIFFIN, Assistant Examiner

U.S. Cl. X.R.

260—2, 31.6, 32.6, 37, 47